United States Patent
Isozaki

(10) Patent No.: US 7,491,418 B2
(45) Date of Patent: Feb. 17, 2009

(54) METHOD OF MANUFACTURING A MAGNETIC RECORDING MEDIUM AND THE MAGNETIC RECORDING MEDIUM FORMED THEREBY

(75) Inventor: Makoto Isozaki, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 626 days.

(21) Appl. No.: 11/075,394

(22) Filed: Mar. 8, 2005

(65) Prior Publication Data

US 2005/0208339 A1   Sep. 22, 2005

(30) Foreign Application Priority Data

Mar. 9, 2004   (JP)   ............................. 2004-066422

(51) Int. Cl.
*B05D 5/12* (2006.01)
(52) U.S. Cl. ...................... 427/127; 427/128; 427/130; 427/131
(58) Field of Classification Search ................. 427/127, 427/128, 130, 131; 428/814
See application file for complete search history.

(56) References Cited

U.S. PATENT DOCUMENTS

| | | | | |
|---|---|---|---|---|
| 5,396,383 | A * | 3/1995 | Gregory et al. | .......... 360/97.02 |
| 2002/0043332 | A1* | 4/2002 | Itai et al. | .................... 156/278 |
| 2003/0044565 | A1 | 3/2003 | Takenoiri et al. | |
| 2003/0049495 | A1* | 3/2003 | Sakai et al. | ........... 428/694 TM |
| 2003/0049498 | A1 | 3/2003 | Shimosato | |
| 2003/0134155 | A1 | 7/2003 | Iso et al. | |
| 2004/0018390 | A1 | 1/2004 | Shimosato | |
| 2004/0023071 | A1 | 2/2004 | Sakai et al. | |
| 2004/0157034 | A1 | 8/2004 | Watanabe et al. | |

FOREIGN PATENT DOCUMENTS

JP   5-266467 A   10/1993
JP   2003-6849 A   1/2003

OTHER PUBLICATIONS

Austrian office action issued in corresponding Singapore application No. 200500799-2, mailed Jun. 13, 2008.

* cited by examiner

*Primary Examiner*—Alain L Bashore
(74) *Attorney, Agent, or Firm*—Rossi, Kimms & McDowell, LLP

(57) ABSTRACT

A method of manufacturing a magnetic recording medium that exhibits high performance and high reliability includes forming a liquid lubricant layer capable of high coverage while retaining a film thickness of 1 nm to 2 nm. The magnetic recording medium includes an underlayer, a magnetic layer, a protective layer, and a liquid lubricant layer sequentially laminated or formed on a substrate. The liquid lubricant layer is formed by coating a liquid lubricant diluted with a solvent on the protective layer to a thickness of at least the surface roughness to form a thick film liquid lubricant layer, pressing a slide member against the surface of the liquid lubricant layer while rotating the medium to adhere the liquid lubricant onto the protective layer, and reducing the thickness of the liquid lubricant layer with a solvent that can dissolve the liquid lubricant to the medium surface.

11 Claims, 5 Drawing Sheets

Seeking Direction

To Recovery Tank

Durable Pass Number
(1000 x)

METHOD OF MANUFACTURING A MAGNETIC RECORDING MEDIUM AND THE MAGNETIC RECORDING MEDIUM FORMED THEREBY

This application is based on, and claims priority to, Japanese Application No. 2004-066422, filed Mar. 9, 2004, and the disclosure of the priority application, in its entirety, including the drawings, claims, and the specification thereof, is incorporated herein by reference.

BACKGROUND

With increase of quantity of information treated by an information processing apparatus, such as a computer, and miniaturization of the information processing apparatus in recent years, efforts have been made to enhance the recording capacity of the information recording devices. Accordingly, recording capacity required by a magnetic recording medium (hereinafter also called "a magnetic disk") used in the information recording devices is consistently increasing. To enhance recording capacity and improve recording performance of a magnetic recording medium, the flight height of the magnetic head must be lowered as much as possible. In particular, a perpendicular magnetic recording system, drawing much attention these days, with the magnetic flux flowing out perpendicularly to the surface of the magnetic recording medium, is required to narrow the magnetic spacing by positioning the magnetic head and the medium surface as close as possible. Recently, flight height of the magnetic head has been decreased to as low as 10 nm or lower.

A common magnetic disk comprises a substrate, an underlayer, a magnetic layer, and a protective layer, on which a liquid lubricant layer is further provided to improve durability. The thickness of the liquid lubricant layer is generally in the range of 1 nm to 2 nm. In that range of film thickness, the actual feature of the lubricant molecules are considered to be an island-like distribution scattered in the surface of the protective layer, rather than forming its own complete thin film layer. The lower layer, the protective layer, is uncovered in the area between the lubricant molecules scattering in the island-like distribution (the area absent of the lubricant), which causes several problems as described below.

A protective layer of a magnetic disk used in general is a carbon film formed by a sputtering method or a CVD method. The surface of the carbon film, being in an active state, is liable to adsorb surrounding gases or contaminants. Some types of the adsorbed gases cause corrosion together with surrounding moisture. Corrosion of the magnetic disk seriously deteriorates electromagnetic conversion characteristics and significantly degrades reliability of the HDD.

A manufacturing process for a magnetic disk in the present day technology commonly includes a tape burnishing step using a working tape after a lubricant coating step. In this step, contaminants attached in the previous steps are removed to ensure stable flight of the magnetic head. Since it is hard for the usually employed thickness of the liquid lubricant layer to completely cover the protective layer as described earlier, the tape burnishing step causes direct contact between the protective layer and the working tape. This generates frictional electric charges, which accumulate on the surface of the magnetic disk. This accumulation of frictional electric charges on the surface of the magnetic disk causes a problem of flight interruption of a glide test head or a magnetic head. If pressure at the tape working step is increased to ensure contaminant elimination in the tape burnishing step, the surface of the magnetic disk is apt to suffer from occurrence of flaws.

The above problem can be solved by wholly covering the protective layer with lubricant, that is, by forming one complete thin film of lubricant layer on the protective layer. A liquid lubricant layer having a thick thickness of 10 nm to 100 nm would completely cover the protective layer. However, such a thick liquid lubricant layer is not appropriate for a magnetic disk when the lowering of the flight height of a magnetic head is required. A next generation magnetic recording system, in which a head slides in contact with a disk, is required to raise the reliability of the magnetic disk by making use of a liquid lubricant layer and avoiding friction between the protective layer and the magnetic head. Therefore, a liquid lubricant layer with high coverage while keeping an appropriate thickness (of about 1 nm to 2 nm) is required for obtaining a magnetic recording medium of high reliability and high performance.

A typical method of forming a liquid lubricant layer is coating a lubricant on the surface of the magnetic disk. The liquid lubricant is coated generally to an average thickness of the liquid lubricant layer of about 1 to 2 nm. It is, however, difficult to sufficiently cover the protective layer by simply coating a lubricant and forming a film of about 1 to 2 nm thickness, as described previously. In a magnetic disk provided with protrusions and dents (or a texture), in particular, the dents may not be coated enough. Some attempts have been made for improving the homogeneity of the lubricant distribution occurring in the process of lubricant layer formation. For example, Japanese Unexamined Patent Application Publication No. 2003-006849 discloses a method in which a buffing process is conducted with rather high contact pressure after coating a lubricant to make the lubricant distribution homogeneous. There is another method in which a lubricant is diluted with an appropriate high solubility solvent, producing a solution with a homogeneous concentration in order to obtain homogeneous lubricant distribution in the liquid lubricant layer obtained after volatilization of the solvent.

However, a satisfactory result has not been achieved by the methods of forming a liquid lubricant layer described above in which the buffing process or the coating of diluted lubricant is conducted. Satisfactory lubricating effect cannot be obtained by the current technology with a mean film thickness of the liquid lubricant layer in a range of 1 to 2 nm. When a buffing process is conducted under high pressure, friction occurs between the buffer and the protective layer, such as a thin film of carbon, raising the risk of generating flaws on the magnetic disk. Accordingly, the buffing process imposes a severe limitation on applicable contacting material and exerting pressure in the buffing process. When a lubricant is coated using a high solubility solvent, although the distribution of the lubricant remaining on the disk surface after volatilization of the solvent can be pretty homogeneous, a complete thin film is not formed with such a quantity of coated lubricant that results in a film thickness of 1 to 2 nm. Thus, the island-like distribution of lubricant still remains.

Accordingly, there remains a need for achieving a lubricant with a film thickness of 1 to 2 nm, without the problems identified above. The present invention addresses this need.

SUMMARY OF THE INVENTION

The present invention relates to a method of manufacturing a magnetic recording medium, and the magnetic recording medium formed thereby. The magnetic recording medium can be used in an information recording device of information processing apparatuses, such as computers, or in a recording device (especially a hard disk drive) mounted on consumer products. The magnetic recording medium can be a perpendicular magnetic recording medium in which a recording head can contact the lubricant layer.

One aspect of the present invention is a method of manufacturing a magnetic recording medium comprising at least an underlayer, a magnetic layer, and a protective layer formed on a substrate. The method includes forming a liquid lubricant layer formed on the protective layer. Specifically, the lubricant layer forming step includes a first step of forming a liquid lubricant layer by coating a liquid lubricant diluted with a solvent on the protective layer to a thickness of at least a surface roughness Rmax of the protective layer, a second step of adhering the liquid lubricant to the protective layer by pressing a slide member against the surface of the liquid lubricant layer while rotating the substrate, and a third step of reducing the thickness of the liquid lubricant layer with a solvent that can dissolve the liquid lubricant to the surface of the liquid lubricant layer while rotating the substrate.

To adjust the film thickness of the liquid lubricant layer to a desired value, the thickness of the liquid lubricant layer can be increased by repeating the first step using the same or a different liquid lubricant. More specifically, this can be achieved after the first or third step. Also, the thickness of the liquid lubricant layer can be decreased by repeating the third step using the same or a different solvent that can dissolve the liquid lubricant. The liquid lubricant removed in the third step can be recovered and recycled.

The pressure the slide member applies against the surface of the liquid lubricant layer in the second step can be in a range of 0.01 to 2.0 kgf/cm$^2$. The slide member for enhancing adhesion of the lubricant can be in a form of a tape, a pad, or a sponge, and can be made of a woven fabric, a nonwoven fabric, or a resin.

The thickness of the liquid lubricant layer after the first step can be around 10-20 nm, and the thickness of the liquid lubricant layer after the third step can be around 1-2 nm.

Another aspect of the present invention is the magnetic recording medium manufactured by the method described above.

BRIEF DESCRIPTION OF THE DRAWINGS

FIGS. 3(a)-3(c) schematically illustrate the structure of a magnetic recording medium in the process of forming a liquid lubricant layer, in which FIG. 3(a) shows the medium before applying coating liquid lubricant, FIG. 3(b) the medium after forming a thick film liquid lubricant layer, and FIG. 3(c) the medium after diminishing the thickness of the thick film liquid lubricant layer.

DETAILED DESCRIPTION

A desirable coating method for preventing the liquid lubricant layer from the island-like distribution of lubricant would be, in principle, to extend the stock solution of the lubricant without diluting over the surface of the protective layer in an extremely thin and homogeneous condition. The coating method, however, is not desirable because it wastes excessive raw liquid, which is presently expensive.

The present inventors have made extensive studies on formation of a liquid lubricant layer and discovered that, when coating a lubricant onto a carbon film (protective layer), only one or two molecular layers in the bottom layers tightly adhere to the carbon film, while the lubricant molecules in the upper layers exhibit relatively weak adhesion force and are easily removed. Even if a thick lubricant layer is formed by a lubricant coating to a thickness of several tens to several hundreds of nanometers, the fraction of the lubricant tightly adhering to the protective layer principally depends on the roughness of the substrate, the quality of the carbon film, and the polar end groups of the liquid lubricant, and thus is confined within a certain range.

The film thickness left after removing the lubricant to the extent that is easily removed by a solvent falls within a range of about one to two nanometers, which corresponds with the thickness of a practical liquid lubricant layer. Although the bonded component that adheres tightly to the protective layer is dominant in the liquid lubricant layer made thin by the solvent, a component that moves relatively freely still remains. Therefore, such a thin film described above can be utilized as a liquid lubricant layer of a magnetic disk as it is.

From this point of view, the present inventors have found that a liquid lubricant layer without island-like distribution of lubricant and well covering the protective layer even though a thin film, can be provided by forming through a series of processes comprising processes of forming a thick film of a liquid lubricant layer, homogenizing the lubricant distribution in the liquid lubricant layer and making the lubricant tightly adhering to the protective layer, and diminishing thickness of the thick liquid lubricant layer with a rinsing solvent.

Figure 1:
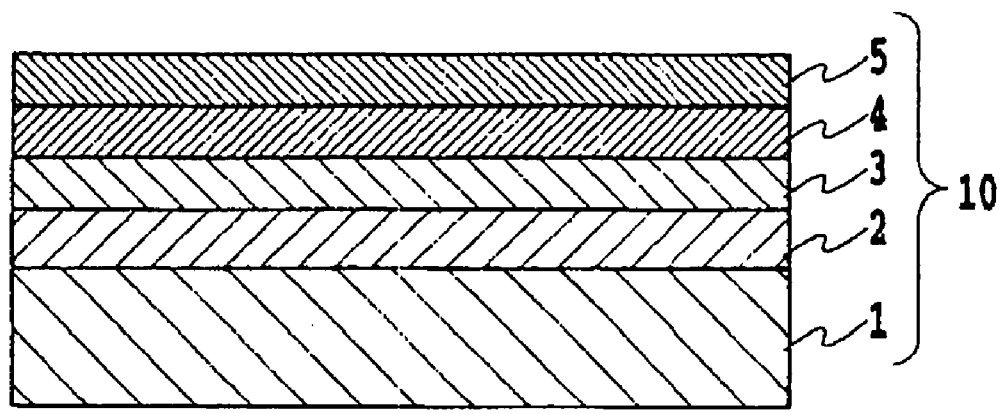
FIG. 1 is a schematic sectional view of a structure of a magnetic recording medium manufactured by the method according to the present invention.
Figure 2:
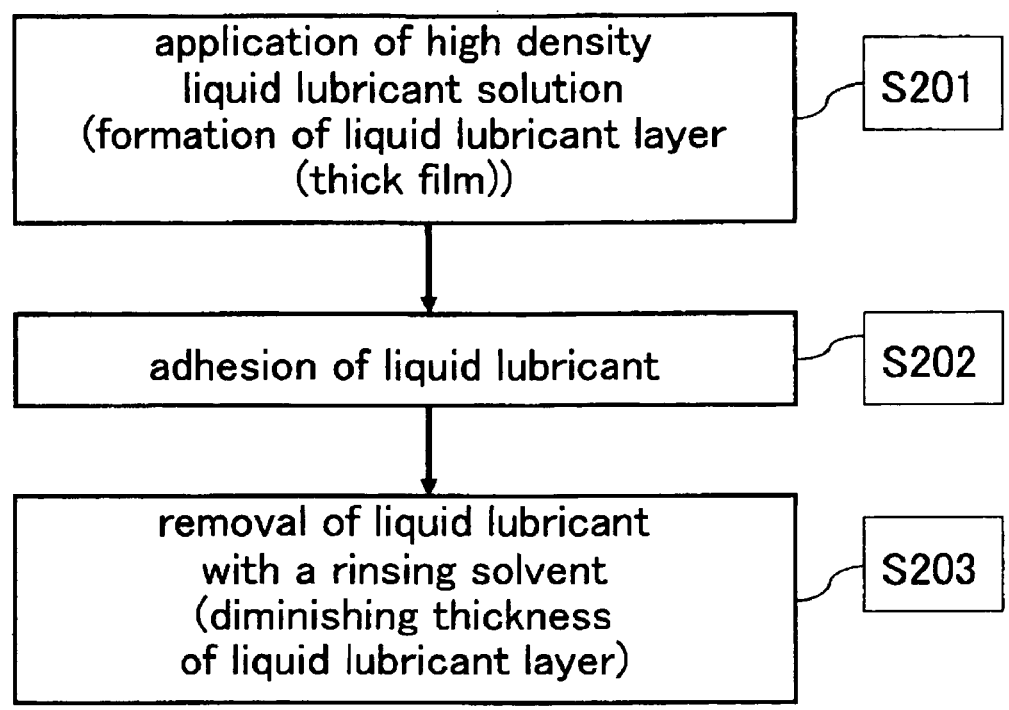
FIG. 2 is a flow chart of the method of manufacturing a magnetic recording medium according to the present invention.

A magnetic recording medium 10 has at least an underlayer 2, a magnetic layer 3, a protective layer 4, and a liquid lubricant layer 5 formed on a substrate 1, as shown in FIG. 1. The magnetic recording medium can be formed by laminating or sequentially laminating at least the underlayer 2, the magnetic layer 3, the protective layer 4, and the liquid lubricant layer 5 on the substrate 1. The liquid lubricant layer can be formed by, as shown in FIG. 2, forming a thick film liquid lubricant layer on the protective layer such as by coating a liquid lubricant diluted with a solvent to a thickness of at least a surface roughness Rmax of the protective layer (S201), adhering the liquid lubricant to the protective layer by pressing a slide member against the surface of the liquid lubricant layer while rotating the magnetic recording medium (S202), and diminishing or reducing the thickness of the liquid lubricant layer by introducing a solvent that is capable of dissolving the liquid lubricant on the surface of the liquid lubricant layer while rotating the magnetic recording medium (S203).

Figure 3A:
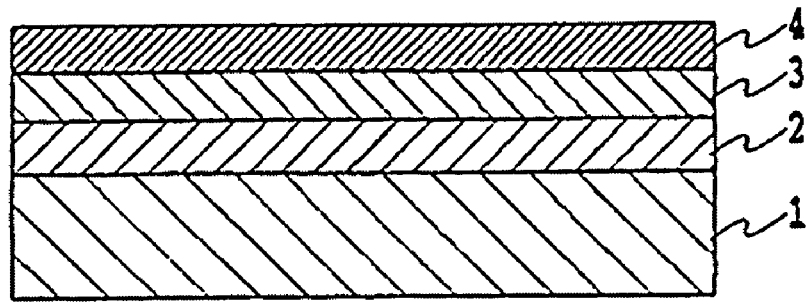
Figure 3B:
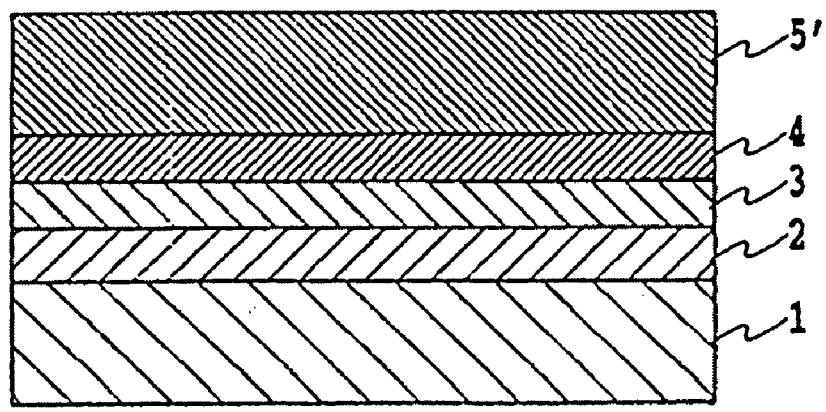
Figure 3C:
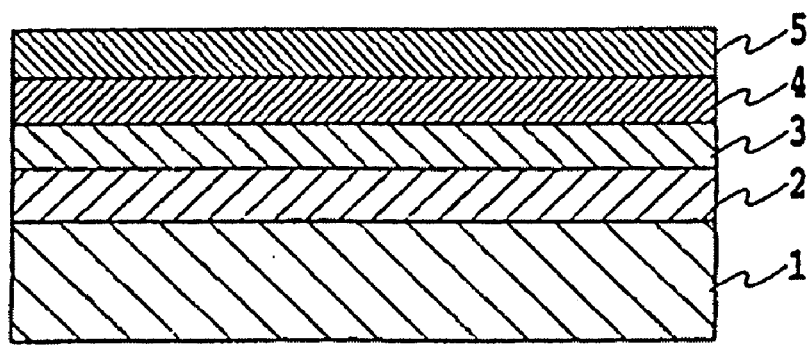

FIGS. 3(a)-3(c) schematically illustrate the structure of the magnetic recording medium in the process of forming the liquid lubricant layer. FIG. 3(a) shows the medium before coating a liquid lubricant. FIG. 3(b) shows the medium after forming a thick film liquid lubricant layer by coating a liquid lubricant (corresponding to S202). FIG. 3(c) shows the medium after diminishing the thickness with a rinsing solvent (corresponding to S203). By forming the liquid lubricant layer through a series of steps of forming a thick film liquid lubricant layer, homogenizing the lubricant distribution and making adhesion of the lubricant onto the protective surface, and diminishing the thickness of the thick film liquid lubricant layer with a rinsing solvent, an effect is achieved that is almost equivalent to the effect obtained by a method of rubbing lubricant molecules directly onto the carbon surface.

A liquid lubricant layer is formed in which the lubricant density is high and most of the principal chains of the lubricant molecules are aligning parallel to the plane of the lubricant layer. As a result, the surface of the protective layer of carbon film is covered with a high ratio, without disturbing flight of the magnetic head even though the lubricant layer is a thin film having a thickness of only 1 to 2 nm, which is the desired thickness of a liquid lubricant layer.

The present method does not impose any special limitation on a structure of the magnetic recording medium, or on materials and deposition conditions of the layers of the medium. Commonly used techniques in the art can be employed, except that the liquid lubricant layer is formed through the steps specified above. The structure of a magnetic recording medium of the invention basically comprises a substrate, an underlayer, a magnetic layer, a protective layer, and a liquid lubricant layer, and can be further provided with additive layers, such as an intermediate layer, as required.

The substrate can be made of a material from any of aluminum alloy, strengthened glass, crystallized glass, ceramics, silicon, polycarbonate, and polymer resin, although not limited to these materials. A substrate surface is preferably subjected to texturing for improving stability of head flight and magnetic alignment.

The underlayer can be formed of a nonmagnetic material, such as Ni—P, CoZrNb, or FeTaC, according to a known deposition method, such as a sputtering method or a plating method.

The magnetic layer can be formed of a magnetic material selected from CoCrPt, CoCrTa, CoCrPtB, CoPt—$SiO_2$, and CoCrPt—$SiO_2$, for example, by depositing the material according to a deposition technique, such as a sputtering method.

The protective layer can be composed of a thin film of $SiO_2$ or carbon, the latter being particularly favorable. The carbon thin film can be formed by applying a CVD method (of ion beam system using ethylene gas, for example) or a sputtering method (of DC magnetron system using an argon+nitrogen gas and a target of graphite, for example).

The following describes a process for forming a liquid lubricant layer in detail. Formation of a liquid lubricant layer is performed through a series of steps of forming a thick film liquid lubricant layer, homogenizing lubricant distribution and making adhesion onto a protective layer of the liquid lubricant layer, and diminishing the thickness of the thick liquid lubricant layer with a rinsing solvent, as previously mentioned. These specified steps can be applied without depending on the property of the protective layer and to any type of protective layer.

The first step is forming a thick film liquid lubricant layer, which can be formed by, for instance, coating a liquid lubricant diluted by a solvent on a protective layer, such as using any known manner. A practicable liquid lubricant in the invention can be a fluorine-containing lubricant such as perfluoropolyether including FOMLIN-Z-DOL, AM3001, and Z-TETRAOL (all manufactured by SOLVAY SOLEXIS K.K.), which are commonly used for lubricant of a magnetic recording medium. A solvent for diluting the liquid lubricant only needs compatibility with the lubricant and to have the property to form a homogeneous solution, and is not limited to a special solvent. The solvent can be an organic solvent of fluorocarbon, specific examples of which include HFE7200 (a product of SUMITOMO 3M Limited) and VERTREL (supplied from DU PONT Kabushiki Kaisha). Dilution of the lubricant is conducted corresponding with the quality and the surface roughness Rmax of the protective film. The concentration of the lubricant solution is favorably higher than the concentration of a solution commonly used in the art. The concentration of a lubricant solution used in the invention is determined in a range of about 1 wt % to 5 wt %. If the solution concentration is higher than 5 wt %, dissolution of the lubricant becomes insufficient and insoluble components aggregate, resulting in fluctuation of thickness of the film coating in the first step, and, in addition, causing choking of a nozzle in a spin coating apparatus, for example, used in the coating process. If the solution concentration is lower than 1 wt %, it is difficult to form a thick film having a required thickness of 10 to 20 nm.

Figure 4:
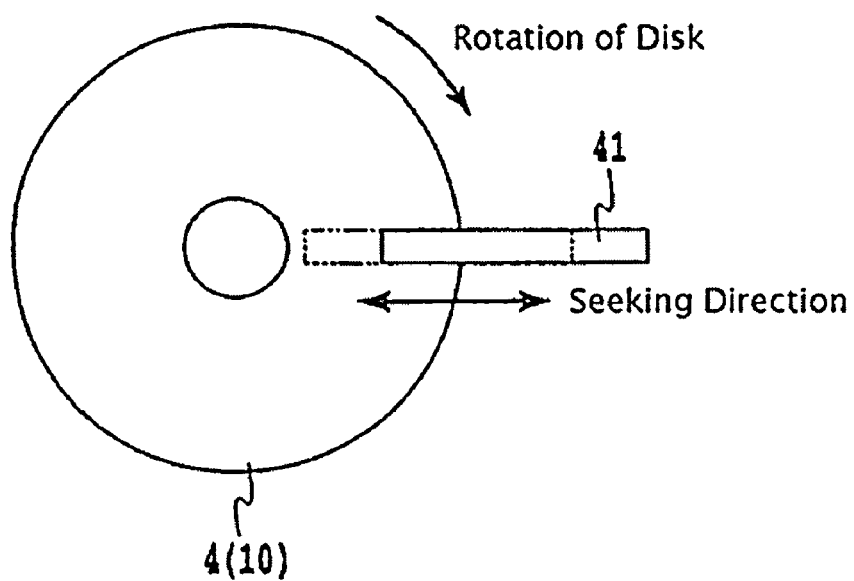
FIG. 4 schematically illustrates the movement of the disk and the ejection nozzle in the step of applying coating a liquid lubricant.

The liquid lubricant can be applied by means of a known method such as dipping or spin coating. The dipping method, however, occasionally attaches a large amount of lubricant onto the end region of the disk surface and hinders adequate removal of the thick film of lubricant on the innermost part of the disk. Therefore, the spin coating method is preferable, which can control the coating area. The spin coating method allows using a technique in which a region of about 1 mm from the innermost part of the disk can be left uncoated considering the following step of diminishing the thickness with a rinsing solvent. In the process of diminishing the thickness with a rinsing solvent, excess lubricant is securely removed by ejecting the solvent from the inner region than this region of the disk surface by means of the spin-coating method, and the diminishing of the thick film liquid lubricant layer can be performed. The control of the coating region in the spin-coating method can be accomplished, as shown in FIG. 4, by appropriately adjusting the rotating speed of the magnetic disk 10 and the seeking speed of the ejecting nozzle 41. The details of the control of the coating region are disclosed in Japanese Unexamined Patent Application Publication No. H5-266467.

The amount of the liquid lubricant coating in the first step must be enough to cover from the depth of concave to the height of convex of the surface, that is, enough to form a film thickness at least Rmax. The "Rmax" in this specification is the one specified in JIS (Japanese Industrial Standards) B0601-1982. A film thickness desired in the present method is roughly in a range of 10 to 20 nm depending on the surface property of the protective layer. A desired thickness of the lubricant can be coated either at one time or in separated plural times. When the film thickness of the liquid lubricant needs to be further increased after the third step, the increase can be attained by repeating the process of liquid lubricant coating using the same liquid lubricant or a different liquid lubricant.

Figure 5:
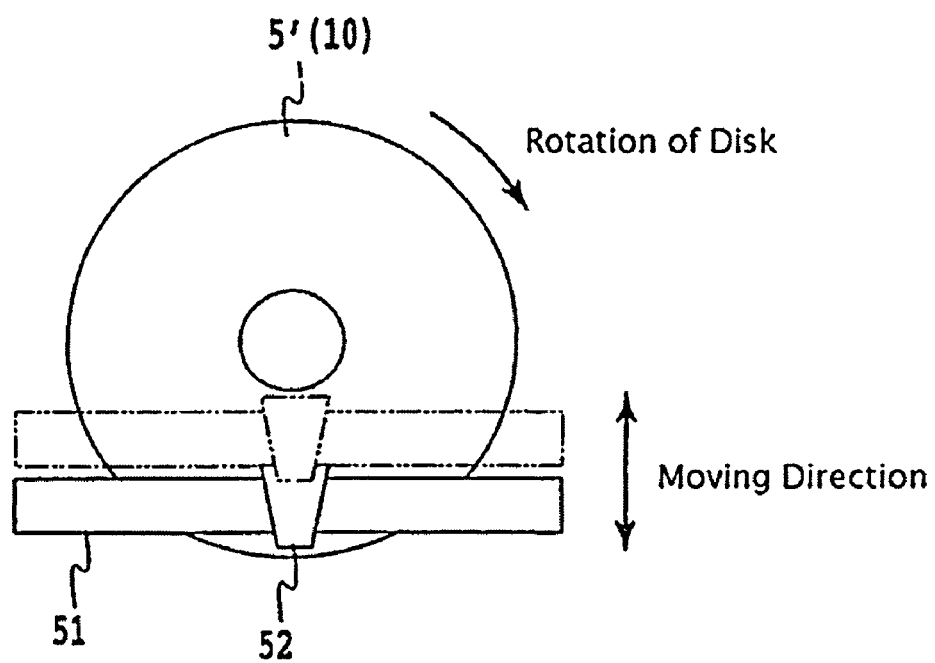
FIG. 5 schematically illustrates the movement of the disk and the slidable slide member in the process of enhancing adhesion of the liquid lubricant.

The second step is homogenizing lubricant distribution and adhering the lubricant onto the protective layer of the lubricant layer by pressing a slide member onto the surface of the thick film liquid lubricant layer 5' formed in the previous step while rotating the magnetic disk 10 having the liquid lubricant layer (for example, by pressing a wiping tape 51 by a solid pad 52 and moving the wiping tape along the surface of the thick film liquid lubricant layer 5'). See FIG. 5. In the previous coating step, such an amount of lubricant that saturates on the disk surface has been coated to form a thick film of the liquid lubricant layer and lubricity is sufficiently secured by sliding the member on the lubricant layer. Therefore, the present method completely eliminates the problems of generation of flaws or break away of fibers of the tape in the tape working process.

The member can be made of woven fabric, nonwoven fabric, and resins of polyethylene terephthalate or urethane, and can be in a form of tape, pad, or sponge. The member, however, is not limited to a fibrous type, but can be any member that has tiny concave and convex surfaces and is sufficiently smooth to spread the lubricant uniformly on the disk surface.

The pressure exerted on the disk surface on the working process is critical and thus must be proper to attain an expected effect. If the pressure of the member against the disk surface is too low, the lubricant would not be rubbed in over the disk surface that has a certain roughness. If the pressure is too high, the pressure pushes away the lubricant between the disk and the member and lowers the lubricating ability during the working process, generating flaws on the disk surface. The proper pressure exerted on the disk surface during the working process is approximately in a range of 0.01 to 2.0 $kgf/cm^2$, depending on the film quality and surface roughness Rmax of the protective layer. The rotating speed of the disk during the working process has no limitation in the low speed side. On the other hand, a high rotating speed can scatter the thick lubricant due to the centrifugal force during the working process, causing insufficient lubricating ability during the working process, as in the case of a too high pressure. A proper rotating speed of a disk is at most about 4,000 rpm, depending on the film quality and surface roughness Rmax of the protective layer.

To adhere the lubricant layer to the protective layer and raise the bonding ratio between the two layers is an important technology for preventing scattering of the lubricant during the disk rotation and transfer of the lubricant to the magnetic head. To raise the bonding ratio, the lubricant is generally heated or UV irradiated. A sufficiently high bonding ratio can be achieved without heating or UV irradiation in the present method. However, the heating process or UV irradiation process can be added as required for further raising the bonding ratio.

The third step is diminishing or reducing the thickness of the lubricant layer with a rinsing solvent. Specifically, a solvent that can dissolve the lubricant is ejected or introduced onto the lubricant layer surface and excess lubricant is removed while rotating the magnetic disk 10. The rotating speed of the disk during rinsing with solvent is preferably at least 500 rpm, since a too low speed of rotation lowers removing effect by a centrifugal force and is liable to generate uneven removal. The seeking speed of the ejecting nozzle is preferably at most about 50 mm/s.

Usable solvents for diminishing the lubricant are the same as those exemplified for the solvents of dilution of the lubricant. The solvent is selected from the solvents exhibiting high dissolving ability (high removing effect for the lubricant) and the solvents with low dissolving ability corresponding to the degree of thickness reduction, considering parameters at the process of ejecting the solvent by the spin-coating method. The thickness of the lubricant layer can be diminished to a desired target thickness by repeating the steps of removing liquid lubricant using the same or different solvent under appropriately selected parameters.

Diminishing the thickness of the lubricant layer also can be conducted, besides the above method, by a vapor method or a dipping method. The vapor method, however, is liable to generate uneven removal and needs unacceptably large quantities of solvent. The dipping method accumulates the removed lubricant in the dipping bath. So, a removing effect and a coating effect coexist in the course of repeating the steps. Thus, the two methods are not suited for mass production.

Figure 6:
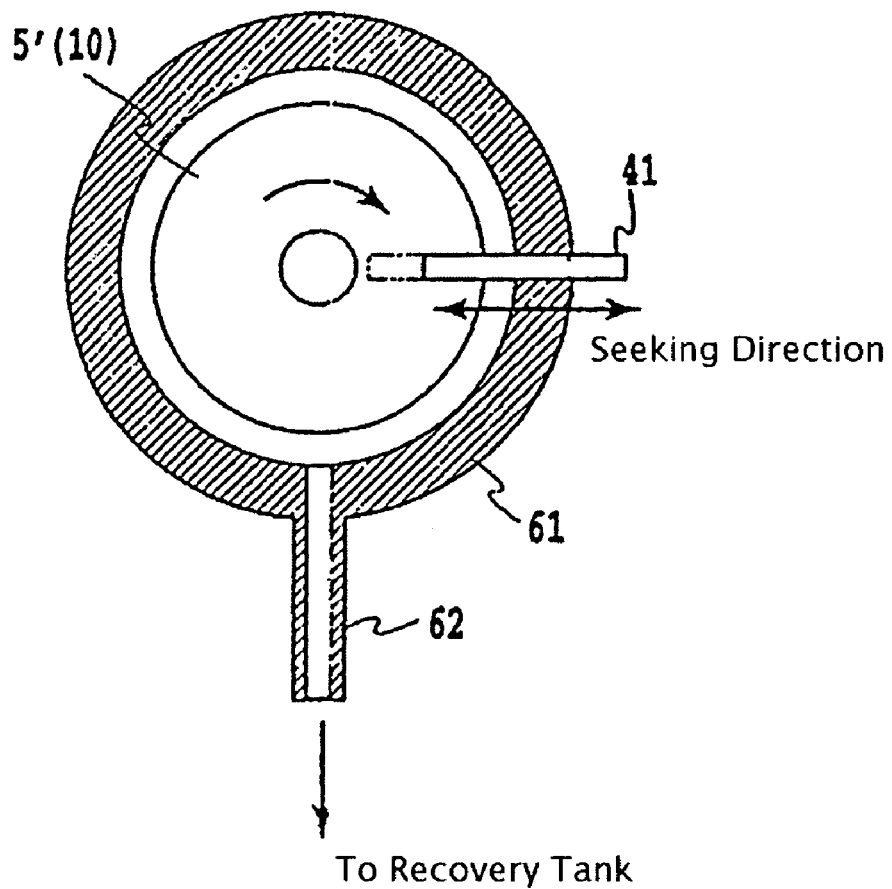
FIG. 6 schematically illustrates an example of a liquid receiving structure in the process of removing the liquid lubricant with a rinsing solvent.

As described above, the present manufacturing method provides a magnetic recording medium exhibiting high quality and high reliability having a lubricant layer that has a desirable thickness and high coverage. When the magnetic recording medium of a contact type perpendicular magnetic recording system is formed using the present method, the lubricating characteristic in disk operation is remarkably improved. Although the present method uses a larger amount of liquid lubricant than the conventional methods, the liquid lubricant removed with the rinsing solvent can be recovered and recycled. The recovery of liquid lubricant can be conducted, as shown in FIG. 6, by providing a liquid receiving structure (for example, a liquid receiving cover 61 and a transfer tube 62 to a recovery tank) around periphery of the disk 10.

The following examples are specific embodiments according to the present invention. The present invention is not limited to these examples, and various modifications are to be encompassed within the spirit and scope of the invention.

In the first example (hereafter SAPO-11 Ex 1), a magnetic recording disk was formed by sequentially layering an underlayer, a perpendicular magnetic layer, and a protective layer on an aluminum substrate having a 3.5 inch diameter and a thickness of 1.27 mm. The surface roughness Rmax of the substrate was 7.8 nm. The underlayer 200 nm thick was deposited by a DC sputtering method in argon gas using a CoZrNb target. The perpendicular magnetic layer 10 nm thick was deposited by an RF sputtering method in argon gas using a CoCrPt—$SiO_2$ target. The protective layer having a thickness of 3 nm of a carbon thin film was formed by CVD of ion beam system using ethylene gas. The surface roughness of the carbon thin film was 7.8 nm.

On the protective layer, a liquid lubricant layer was formed as follows. Initially, a liquid lubricant, FOMBLIN-Z-DOL (manufactured by SOLVAY SOLEXIS K.K.) was diluted with an organic solvent of fluorocarbon, FLUORINERT FC77 (manufactured by SUMITOMO 3M Limited) to prepare a solution with a concentration of 3 wt %. The prepared lubricant solution was coated to a surface of the disk with a film thickness of 10.4 nm using a spin-coating method. In the spin-coating process, the rotating speed of the disk was 1,500 rpm and the seeking speed of the nozzle was 10 mm/s.

Then, a wiping tape (TORAYSEE, a product of TORAY INDUSTRIES, Inc.) was pushed onto the disk with a pressure of 0.03 $kgf/cm^2$ while the disk was spun at 100 rpm. The tape of a half inch wide was first passed from outer to inner circumference and from inner to outer circumference at a seeking speed of 2.5 mm/s, to rub the lubricant into the disk surface and make the lubricant to adhere to the disk surface. At this moment, the thickness of the lubricant layer was 4.3 nm.

Then, a rinsing solvent of an organic solvent of fluorocarbon, FLUORINERT FC77 was ejected while rotating the disk at 1,500 rpm and moving the nozzle from inner to outer circumference of the disk at a seeking speed of 10 mm/s, thereby removing excessive lubricant and diminishing the thickness of the lubricant layer to form a thin film of lubricant layer on the disk. At this moment, the thickness of the lubricant layer was 1.8 nm, which is right on target.

In the second example (hereafter Ex 2), a magnetic recording medium was manufactured in the same manner as in Ex 1, except for the surface roughness of the protective layer/substrate, and the thickness of the thick film. Specifically, an underlayer, a perpendicular magnetic layer, and a protective layer were sequentially formed as in Ex 1 on a substrate with a surface roughness Rmax of 3.9 nm, and then a lubricant layer was formed. The surface roughness of the protective layer Rmax was 3.9 nm. The lubricant layer was formed by coating a lubricant solution with a concentration of 3 wt % on the protective layer to a film thickness of 11.2 nm, tape processing (the film thickness thereafter was 4.0 nm), and then diminishing the film thickness using the same rinsing solvent of Ex 1, to obtain a lubricant layer 1.6 nm thick.

In the third example (hereafter Ex 3), a magnetic recording medium was manufactured in the same manner as in Ex 1, except for the method of depositing the protective layer. The protective layer was formed by sputtering a target material of graphite according to a sputtering method of DC magnetron type using argon gas and nitrogen gas. The surface roughness Rmax of the protective layer was 7.8 nm. A lubricant layer was formed by coating a lubricant solution with a concentration of 3 wt % on the protective layer to a film thickness of 9.8 nm, tape processing (the film thickness thereafter was 3.9 nm), and then diminishing the film thickness using the same rinsing solvent of Ex 1, to obtain a lubricant layer 1.5 nm thick.

In a first comparative example (hereafter CEx 1), the magnetic disk was manufactured in the same manner as in Ex 1, except that the lubricant layer having the same target thickness as in Ex 1 was formed without forming a thick film liquid lubricant layer and homogenizing lubricant distribution and making the lubricant adhere to the protective layer using a tape. Specifically, after sequentially forming an underlayer, a perpendicular magnetic layer, and a protective layer on a substrate as in Ex 1, the lubricant layer was formed by coating a lubricant solution with a concentration of 0.02 wt % on the surface of the disk by a spin-coating method. The thickness of the obtained lubricant layer was 1.8 nm. The surface roughness Rmax of the protective layer was same as before, 7.8 nm.

In the second comparative example (hereafter CEx 2), a magnetic recording medium was manufactured in the same manner as in Ex 1, except that the thickness of the thick film lubricant layer formed on the protective layer was less than Rmax. After sequentially forming an underlayer, a perpendicular magnetic layer, and a protective layer as in Ex 1, a lubricant layer was formed as follows. The lubricant layer was formed by coating a lubricant solution with a concentration of 0.1 wt % on the protective layer to a thickness of 3.5 nm, tape processing (the film thickness thereafter was 3.2 nm), and then diminishing the film thickness using the same rinsing solvent of Ex 1, to form a lubricant layer 1.8 nm thick. The surface roughness of the protective layer was 7.8 nm.

The bonding ratio, which represents the adhesive force between the lubricant and the protective layer, was measured on the obtained magnetic disks. The results are shown in Table 1. The bonding ratio was defined by a ratio of an absorption coefficient of the lubricant component (a C-F peak) in an FT-IR (Fourier transform infrared spectroscopy) after immersion in FC77 solution for 5 minutes and absorption coefficient before the immersion. Slide durability was then studied on the magnetic disks of Ex 1 and CEx 1.

Figure 7:
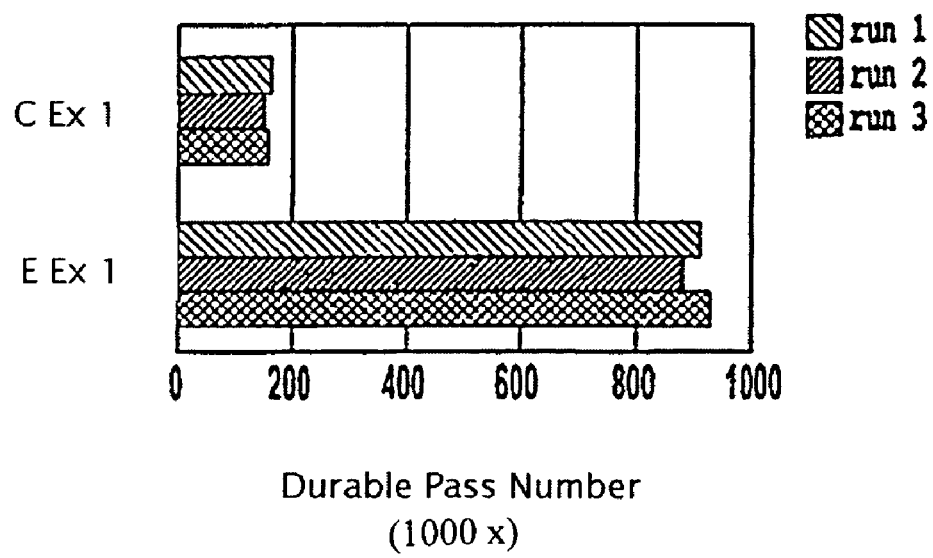
FIG. 7 is a graph showing the durability during contact running (sliding) of magnetic disks obtained in the first example and the first comparative example.

The slide durability was evaluated by a pass number (rotated number of the disk) until fracture of the carbon protective layer after contact running under a magnetic head with a load of 0.5 gf in a vacuum of 10 Torr. The rotating speed of the disk was fixed to 5,400 rpm, and the radius of the contact running was also fixed at 25 mm. The results are shown by the graph in FIG. 7. The graph of FIG. 7 shows the data on 3 disks randomly selected from the studied plurality of disks. FIG. 7 clearly demonstrates that the samples of Ex 1 exhibit much better durability than the samples of CEx 1. The higher durability is due to the higher coverage and stronger adhesion of the lubricant layer to the carbon protective layer.

Further, occurrence of flaws on the disk surface was evaluated by conducting tape burnishing with high contact pressure on every magnetic disk of both the present examples and the comparative examples. The tape burnishing was conducted by a roller contact method for ten seconds with a roller hardness of 40° using a polishing tape (WA8000) under conditions of a pressure of 1.0 kgf/cm$^2$ and 1,000 rpm. Then, observation was made on the degree of occurrence of flaws due to working process using a surface inspection apparatus. The results are shown in Table 1.

TABLE 1

VARIATION OF LUBRICANT LAYER THICKNESS, BONDING RATIO, AND FLAWS DUE TO TAPE WORKING PROCESS

| EXAMPLES | RMAX (NM) | DEPOSITION METHOD OF PROTECTIVE LAYER | LIQUID LUBRICANT LAYER THICKNESS | | | BONDING RATIO (%) | FLAWS DUE TO WORKING |
|---|---|---|---|---|---|---|---|
| | | | AFTER THICK LAYER COATING (NM) | AFTER TAPE PROCESSING (NM) | AFTER RINSING WITH SOLVENT (NM) | | |
| Ex 1 | 7.8 | CVD | 10.4 | 4.3 | 1.8 | 70 | none |
| Ex 2 | 3.9 | CVD | 11.2 | 4.0 | 1.6 | 75 | none |
| Ex 3 | 7.8 | nitriding sputtering | 9.8 | 3.9 | 1.5 | 65 | none |
| CEx 1 | 7.8 | CVD | — | — | 1.8 | 20 | observed |
| CEx 2 | 7.8 | CVD | 3.5 | 3.2 | 1.8 | 25 | observed |

Table 1 clearly shows that the liquid lubricant layer formed according to the present method exhibits a higher adhesion rate than the lubricant layer formed by only usual spin coating process of the same lubricant to the same thickness. In the magnetic disks provided with a liquid lubricant layer according to the present method, occurrence of flaws during tape burnishing process is prevented and good durability against polishing tape is achieved. It has been also found that the flows due to working process are generated when the film thickness at the thick film formation is less than Rmax even though adhesion of lubricant by tape processing is conducted after the thick film formation. This fact shows that a satisfactory liquid lubricant layer cannot be obtained unless the thick film after lubricant coating stage has a sufficient thickness, even if the thickness of the lubricant layer at the final stage is in the same level.

According to the invention, a liquid lubricant layer is formed securing high coverage while retaining thin layer of the liquid lubricant, and thus, a magnetic recording medium with high performance and high reliability is provided.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

What is claimed is:

1. A method of manufacturing a magnetic recording medium comprising a substrate with at least an underlayer, a magnetic layer, and a protective layer formed on the magnetic layer, the method comprising:
 a first step of forming a liquid lubricant layer by coating a liquid lubricant diluted with a solvent on the protective layer to a thickness of at least a surface roughness Rmax of the protective layer;
 a second step of adhering the liquid lubricant to the protective layer by pressing a slide member against the surface of the liquid lubricant layer while rotating the substrate; and
 a third step of reducing the thickness of the liquid lubricant layer with a solvent that can dissolves the liquid lubricant to the surface of the liquid lubricant layer while rotating the magnetic recording medium.

2. The method of manufacturing a magnetic recording medium according to claim 1, further including the step of increasing the thickness of the liquid lubricant layer by repeating the first step with the same or a different liquid lubricant.

3. The method of manufacturing a magnetic recording medium according to claim 1, further including the step of increasing the thickness of the liquid lubricant layer after the first or third step by repeating the first step using the same or a different liquid lubricant.

4. The method of manufacturing a magnetic recording medium according to claim 1, further including the step of further decreasing the thickness of the liquid lubricant layer by repeating the third step using the same or a different solvent that can dissolve the liquid lubricant.

5. The method of manufacturing a magnetic recording medium according to claim 1, wherein the slide member is composed of a woven fabric, a nonwoven fabric, or a resin and is a form of a tape, a pad, or a sponge.

6. The method of manufacturing a magnetic recording medium according to claim 1, further including the step of recovering the liquid lubricant removed in the third step.

7. The method of manufacturing a magnetic recording medium according to claim 1, wherein the magnetic recording medium is a perpendicular magnetic recording medium in which a recording head contacts the lubricant layer.

8. The method of manufacturing a magnetic recording medium according to claim 1, wherein the pressure the slide member applies against the surface of the liquid lubricant layer in the second step is in a range of 0.01 to 2.0 kgf/cm$^2$.

9. The method of manufacturing a magnetic recording medium according to claim 1, wherein the thickness of the liquid lubricant layer after the first step is around 10-20 nm.

10. The method of manufacturing a magnetic recording medium according to claim 1, wherein the thickness of the liquid lubricant layer after the third step is around 1-2 nm.

11. The method of manufacturing a magnetic recording medium according to claim 1, wherein the third step comprises applying the solvent to the lubricant layer while rotating the magnetic recording medium at a speed of at least 500 rpm to rinse the lubricant layer and remove excess lubricant.

* * * * *